United States Patent
Shao et al.

(10) Patent No.: US 10,936,782 B2
(45) Date of Patent: Mar. 2, 2021

(54) SEMICONDUCTOR PROCESS MODELING TO ENABLE SKIP VIA IN PLACE AND ROUTE FLOW

(71) Applicant: INTERNATIONAL BUSINESS MACHINES CORPORATION, Armonk, NY (US)

(72) Inventors: Dongbing Shao, Wappingers Falls, NY (US); Zheng Xu, Wappingers Falls, NY (US); Lawrence A. Clevenger, Saratoga Springs, NY (US)

(73) Assignee: International Businesss Machines Corporation, Armonk, NY (US)

( * ) Notice: Subject to any disclaimer, the term of this patent is extended or adjusted under 35 U.S.C. 154(b) by 0 days.

(21) Appl. No.: 16/682,365

(22) Filed: Nov. 13, 2019

(65) Prior Publication Data
US 2020/0082048 A1    Mar. 12, 2020

Related U.S. Application Data

(62) Division of application No. 15/962,461, filed on Apr. 25, 2018, now Pat. No. 10,586,012.

(51) Int. Cl.
| | |
|---|---|
| G06F 9/455 | (2018.01) |
| G06F 7/50 | (2006.01) |
| G06F 30/394 | (2020.01) |
| G06F 30/398 | (2020.01) |
| G06F 111/04 | (2020.01) |
| G06F 111/20 | (2020.01) |

(52) U.S. Cl.
CPC .......... G06F 30/394 (2020.01); G06F 30/398 (2020.01); *G06F 2111/04* (2020.01); *G06F 2111/20* (2020.01)

(58) Field of Classification Search
USPC ........................ 716/110, 111, 118, 119, 126
See application file for complete search history.

(56) References Cited

U.S. PATENT DOCUMENTS

| | | | |
|---|---|---|---|
| 5,196,362 A | 3/1993 | Suzuki | |
| 5,475,264 A | 12/1995 | Sudo et al. | |
| 6,430,058 B1 * | 8/2002 | Sankman | ............ H01L 21/4853 257/E23.067 |
| 7,075,185 B2 | 6/2006 | Nelson et al. | |
| 7,725,860 B1 | 5/2010 | Kwong et al. | |

(Continued)

FOREIGN PATENT DOCUMENTS

WO    2016105402 A1    6/2016

OTHER PUBLICATIONS

List of IBM Patents or Patent Applications Treated as Related dated Nov. 13, 2019, 2 pages.

*Primary Examiner* — Brian Ngo
(74) *Attorney, Agent, or Firm* — Tutunjian & Bitetto, P.C.; Randall Bluestone

(57) ABSTRACT

A method is presented for incorporating skip vias in a place and route flow of an integrated circuit design. The method includes employing a place and route tool to add the skip vias, each skip via extending through a metallization layer to electrically connect a metal layer above the metallization layer to a metal layer below the metallization layer and, when a violation of a design rule is detected due to the addition of one or more of the skip vias, substituting skip vias that violate the design rule with a standard via.

20 Claims, 9 Drawing Sheets

(56) References Cited

U.S. PATENT DOCUMENTS

| | | |
|---|---|---|
| 8,261,229 B2 | 9/2012 | Hart |
| 8,711,573 B2 | 4/2014 | Gillingham |
| 9,287,250 B2 | 3/2016 | Inagaki et al. |
| 9,805,972 B1* | 10/2017 | Zhang ............... H01L 21/76879 |
| 10,026,687 B1* | 7/2018 | Lin ................... H01L 23/53209 |
| 10,319,629 B1* | 6/2019 | Yang ................. H01L 23/5329 |
| 2005/0041405 A1 | 2/2005 | Kawagoe |
| 2006/0289202 A1* | 12/2006 | Takeuchi .......... H01L 23/49827 |
| | | 174/262 |
| 2008/0120586 A1* | 5/2008 | Hoerold ................. G06F 30/39 |
| | | 716/52 |
| 2013/0056850 A1 | 3/2013 | Kume et al. |
| 2015/0102504 A1 | 4/2015 | Park et al. |
| 2016/0056094 A1 | 2/2016 | Muniandy et al. |
| 2018/0130699 A1* | 5/2018 | Zhang ............... H01L 21/76816 |
| 2018/0342454 A1* | 11/2018 | Zhang ............... H01L 21/76816 |
| 2019/0021176 A1* | 1/2019 | Law .................. H01L 21/76897 |
| 2019/0027401 A1* | 1/2019 | McMahon ........ H01L 21/02063 |

* cited by examiner

SEMICONDUCTOR PROCESS MODELING TO ENABLE SKIP VIA IN PLACE AND ROUTE FLOW

BACKGROUND

Technical Field

The present invention relates generally to semiconductor physical design generation and more specifically, to incorporating skip vias in place and route flows of electronic design automation (EDA) tools.

Description of the Related Art

As technology nodes for integrated circuits get smaller, different parts of the design can pose challenges for integrated circuit (IC) designers. For example, wire delays can dominate cell delays in designs that use process technologies at 10 nm and below. Wire delay mis-correlation can be due to routing topologies, such as high fan-out or congested areas of the design. Further, delay caused by via resistance can become an important issue for the 7 nm technology node and below. Currently, it is difficult to predict how many vias and what kind of vias will be used early in the design development. Yet further, lower metal layers can have 20-40 times per unit length resistance compared to higher metal layers at the 10 nm technology node and below. As a result, long nets in upper layers can have pessimistic delay estimations and short nets in lower layers can have optimistic delay estimations.

SUMMARY

In accordance with an embodiment, a method is provided for incorporating skip vias in a place and route flow of an integrated circuit design. The method includes employing a place and route tool to add the skip vias, each skip via extending through a metallization layer to electrically connect a metal layer above the metallization layer to a metal layer below the metallization layer and, when a violation of a design rule is detected due to the addition of one or more of the skip vias, substituting skip vias that violate the design rule with a standard via.

In accordance with another embodiment, a method is provided for incorporating skip vias in a place and route flow of an integrated circuit design. The method includes placing cells by employing a place and route tool, selecting first metal layer pin access points for each first metal layer shape, adding a skip via over the first metal layer, adding a third metal layer over the skip via, the third metal layer connected to the first metal layer, determining whether a violation of a design rule is triggered due to the addition of the skip via, and, if the violation of the design rule is confirmed, substituting the skip via with a standard via.

In accordance with yet another embodiment, a method is provided for incorporating skip vias in a place and route flow of an integrated circuit design. The method includes placing cells by employing a place and route tool, creating a first metal layer pin connection list, determining whether a skip via can land on one or more first metal layer pins, if confirmed that the skip via can land on the one or more first metal layer pins, determining whether the first metal layer pins are from different cells, and, if the first metal layer pins are from different cells, adding a skip via.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
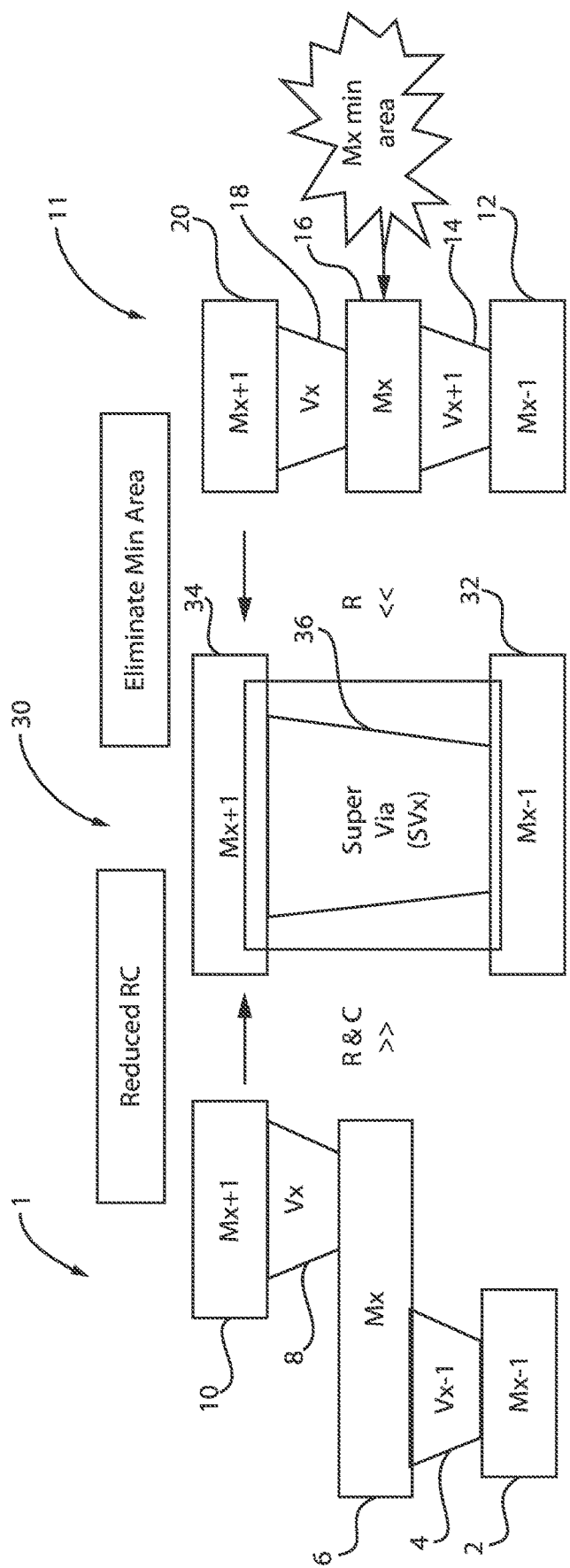
FIG. 1 is a cross-sectional view of a semiconductor structure including a skip via, in accordance with an embodiment of the present invention.

Electronic design automation (EDA) tools can be advantageously employed to optimize integrated circuit design during placement and routing stages. In general, optimization performed during actual routing attempts to eliminate design rule violations, and, therefore, tends to need more iterations and a longer runtime compared to estimated routing performed during placement.

Embodiments in accordance with the present invention provide methods and devices for designing an electronic circuit with EDA tools including skip via (or super via) features, which, in turn, necessitate redefined design rules.

The redefined design rules pertain to vias formed within a semiconductor structure. Design of an electronic circuit, for example, an integrated circuit (IC), is a complicated and time consuming process. Generally, a design flow commences with defining the design specifications or requirements. The requirements of the design are implemented, for example, as a netlist or electronic circuit description. The implementation can be performed by, for example, schematic capture (drawing the design with a computer aided design tool). The implemented design is simulated to verify design accuracy. Design implementation and simulation are iterative processes. For example, errors found by simulation are corrected by design implementation and re-simulated.

Once the design is verified for accuracy with simulation, a physical layout of the design is created. The physical layout describes the detailed design geometries and the relative positioning of each design layer to be employed in actual fabrication. The design layout is very tightly linked to overall circuit performance (e.g., area, speed, and power dissipation) because the physical structure defined by the design layout determines, for example, the parasitic capacitances and resistances, and the silicon area which is employed to realize a certain function. The detailed design layout can be a very intensive and time-consuming design effort and is usually performed utilizing specialized computer aided design (CAD) or Electronic Design Automation (EDA) tools.

The design layout is checked against a set of design rules in a design rule check (DRC). The created design layout must conform to a complex set of design rules in order, for example, to ensure a lower probability of fabrication defects. The design rules specify, for example, how far apart the geometries, on same or different layers, must be, or how large or small various aspects of the layout must be for successful fabrication, given the tolerances and other limitations of the fabrication process. A design rule can be, for example, determining via rules. DRC is a time-consuming iterative process that needs manual manipulation and interaction by the designer. The designer performs design layout and DRC iteratively, reshaping and moving design geometries to correct all layout errors and achieve a DRC clean (violation free) design.

In semiconductor design technology, many metal layers are employed to implement interconnections throughout an integrated circuit. For some integrated circuits, one or more polysilicon (poly) layers, or even active areas, are also used to implement interconnections. Vias are employed to connect from one such metal or polysilicon layer to another metal or polysilicon layer. For example, a via can be used to connect a feature (e.g., a design geometry) on each of two metal layers. The lower one of the two layers is referred to as the landing metal layer and the upper one of the two layers is referred to as the covering layer. A via between a landing metal layer $mt_x$ and the covering metal layer $mt_{x+1}$ is usually referred to as a $v_x$ via (e.g., using the same subscript designation as the landing metal layer).

Embodiments in accordance with the present invention provide methods and devices for incorporating skip vias (or super vias) in a place and route flow of an integrated circuit design. A method for enabling skip vias in design flow is introduced that maintains or controls process risks while maximizing performance gains. The method enables skip vias in automated place and route design automation, enables automated design flow with controlled process risks, enables automated design flow with maximized resistance-capacitance (RC) performance gain, and further enables automated design flow with balanced RC load among two metal layers (e.g., metal layer or level that skip via skips and metal layer or level that skip via connects).

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is a cross-sectional view of a semiconductor structure including a skip via, in accordance with an embodiment of the present invention.

Structure 1 can include a first metallization layer 2 and a standard via 4 connecting the first metallization layer 2 to a second metallization layer 6. The second metallization layer 6 can be connected to a third metallization layer 10 by employing another standard via 8. In structure 1, the standard vias 4, 8 can be misaligned or offset from each other.

Similarly, structure 11 can include a first metallization layer 12 and a standard via 14 connecting the first metallization layer 12 to a second metallization layer 16. The second metallization layer 16 can be connected to a third metallization layer 20 by employing another standard via 18. In structure 11, the standard vias 14, 18 can be aligned.

In structures 1, 11, the standard vias 4, 8, 14, 18 can be replaced with a skip via structure 30. Structure 30 shows a skip via 36 employed to connect the first metallization layer 32 to the third metallization layer 34. The structure 30 enables the reduction of resistance-capacitance and further eliminates Mx minimum area.

The skip via structures of the present invention can be manufactured in a number of ways using a number of different tools. In general, though, the methodologies and tools are employed to form structures with dimensions in the micrometer and nanometer scale. The methodologies, e.g., technologies, employed to manufacture the skip via structures of the present disclosure have been adopted from IC technology. For example, the structures are built on wafers and are realized in films of material patterned by photolithographic processes on the top of a wafer. In particular, the fabrication of the skip via structures uses three basic building blocks: (i) deposition of thin films of material on a substrate, (ii) applying a patterned mask on top of the films by photolithographic imaging, and (iii) etching the films selectively to the mask.

Figure 2:
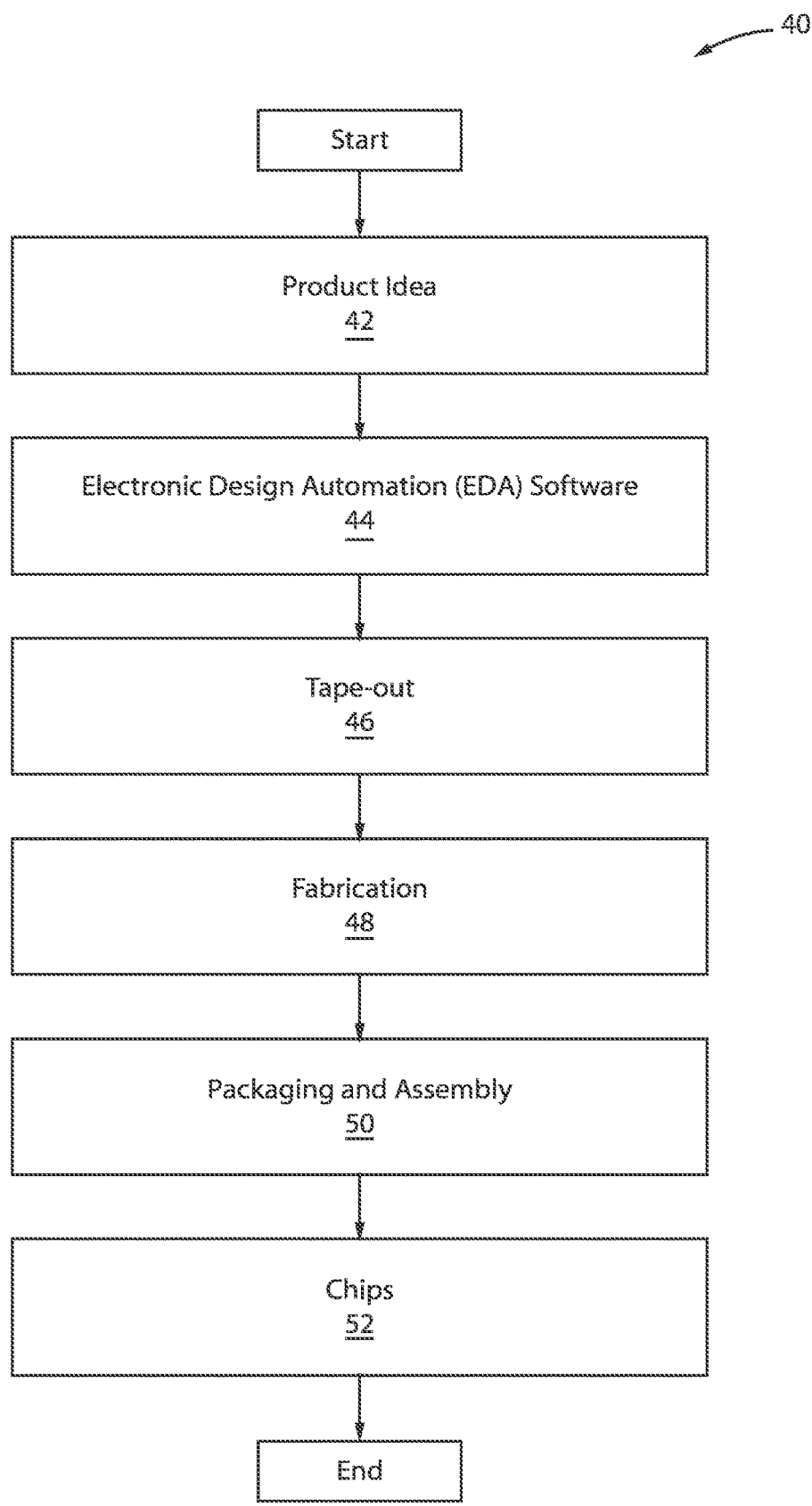
FIG. 2 is a block/flow diagram illustrating a simplified representation of an exemplary digital integrated circuit (IC) flow, in accordance with an embodiment of the present invention.

FIG. 2 is a block/flow diagram illustrating a simplified representation of an exemplary digital integrated circuit (IC) flow, in accordance with an embodiment of the present invention.

At a high level, the process 40 starts with the product idea 42 and is realized in an EDA software design process 44. When the design is finalized, it can be taped-out 46. After tape out, the fabrication process 48 and packaging and assembly processes 50 occur resulting, ultimately, in finished chips 52.

Figure 3:
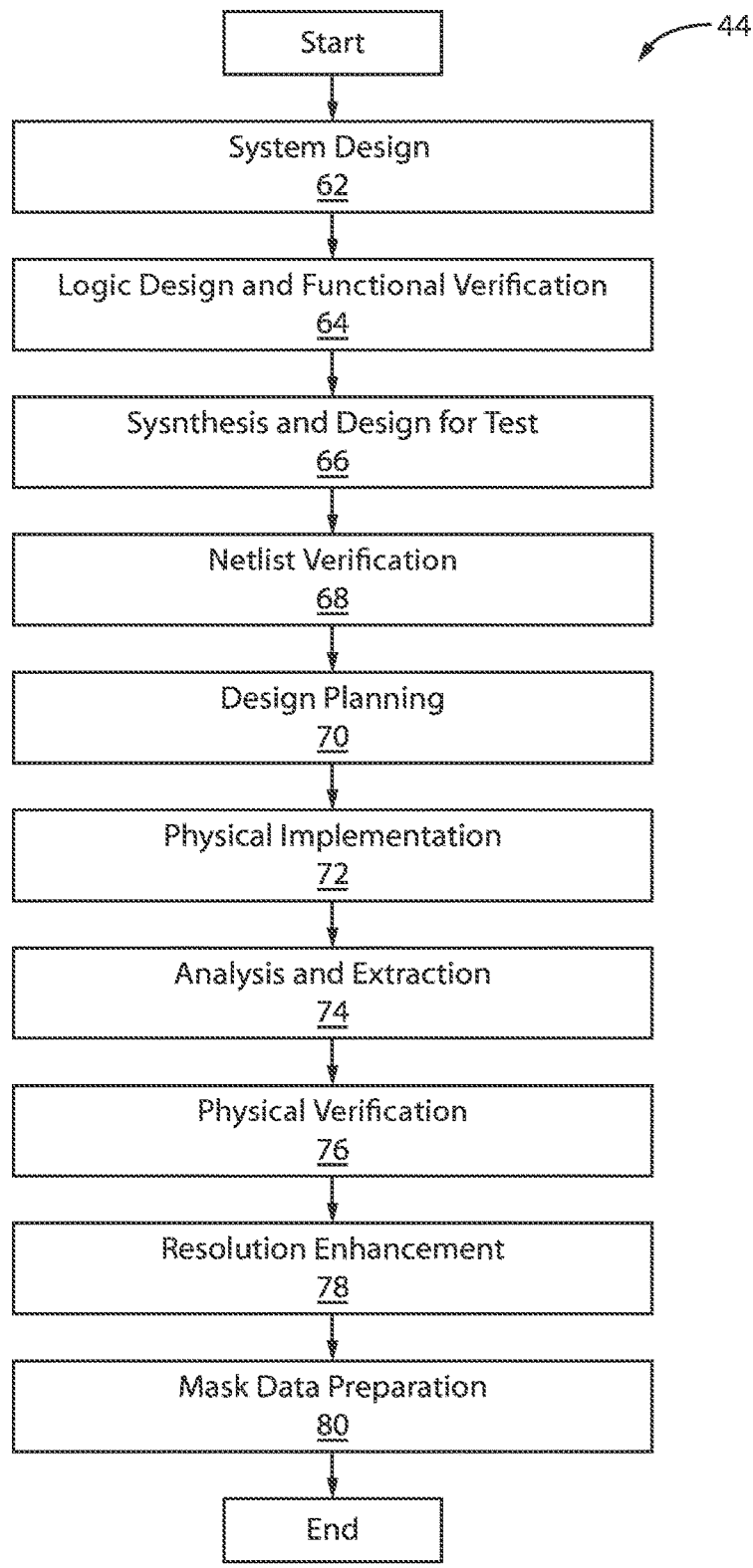
FIG. 3 is a block/flow diagram illustrating an electronic design automation (EDA) software design process, in accordance with an embodiment of the present invention.

FIG. 3 is a block/flow diagram illustrating an electronic design automation (EDA) software design process, in accordance with an embodiment of the present invention.

The EDA software design process 44 includes a number of steps/blocks 62-80, shown in linear fashion for simplicity. In an actual IC design process, the particular design might have to go back through steps until certain tests are passed. Similarly, in any actual design process, these steps can occur in different orders and combinations. This description is therefore provided by way of context and general explanation rather than as a specific, or recommended, design flow for a particular IC.

A brief description of the components steps/blocks of the EDA software design process 44 will now be provided.

Concerning system design 62, the designers describe the functionality to be implemented, and the designers can perform what-if planning to refine functionality, check costs, etc. Hardware-software architecture partitioning can occur at this stage.

Concerning logic design and functional verification 64, the VHSIC Hardware Description Language (VHDL) or Verilog code for modules in the system is written and the design is checked for functional effort. More specifically, it is determined whether the design as checked ensures that the correct outputs are produced.

Concerning synthesis and design for test 66, the VHDL/Verilog is translated to a netlist. The netlist can be optimized for the target technology. Additionally, the design and implementation of tests to permit checking of the finished chip occurs.

Concerning netlist verification 68, the netlist is checked for compliance with timing constraints and for correspondence with the VHDL/Verilog source code.

Concerning design planning 70, an overall floorplan for the chip is constructed and analyzed for timing and top-level routing.

Concerning physical implementation 72, the placement (positioning of circuit elements) and routing (connection of the same) occurs at this block. In one embodiment, the pattern-based RC scaling technique can be performed by the IC Compiler tool. The pattern-based RC scaling technique can advantageously use lower-effort routing results from actual routing to define and/or refine pattern-based RC scaling at the placement stage. The IC Compiler tool can perform both virtual routing, which is done at the placement stage, and actual routing of an integrated circuit design.

Concerning analysis and extraction 74, the circuit function is verified at a transistor level, which in turn permits what-if refinement.

Concerning physical verification 76, various checking functions are performed to ensure correctness for manufacturing, electrical issues, lithographic issues, and circuitry.

Concerning resolution enhancement 78, this process involves geometric manipulations of the layout to improve manufacturability of the design.

Concerning mask data preparation 80, this process provides the "tape-out" data for production of masks for lithographic use to produce finished chips.

Figure 4:
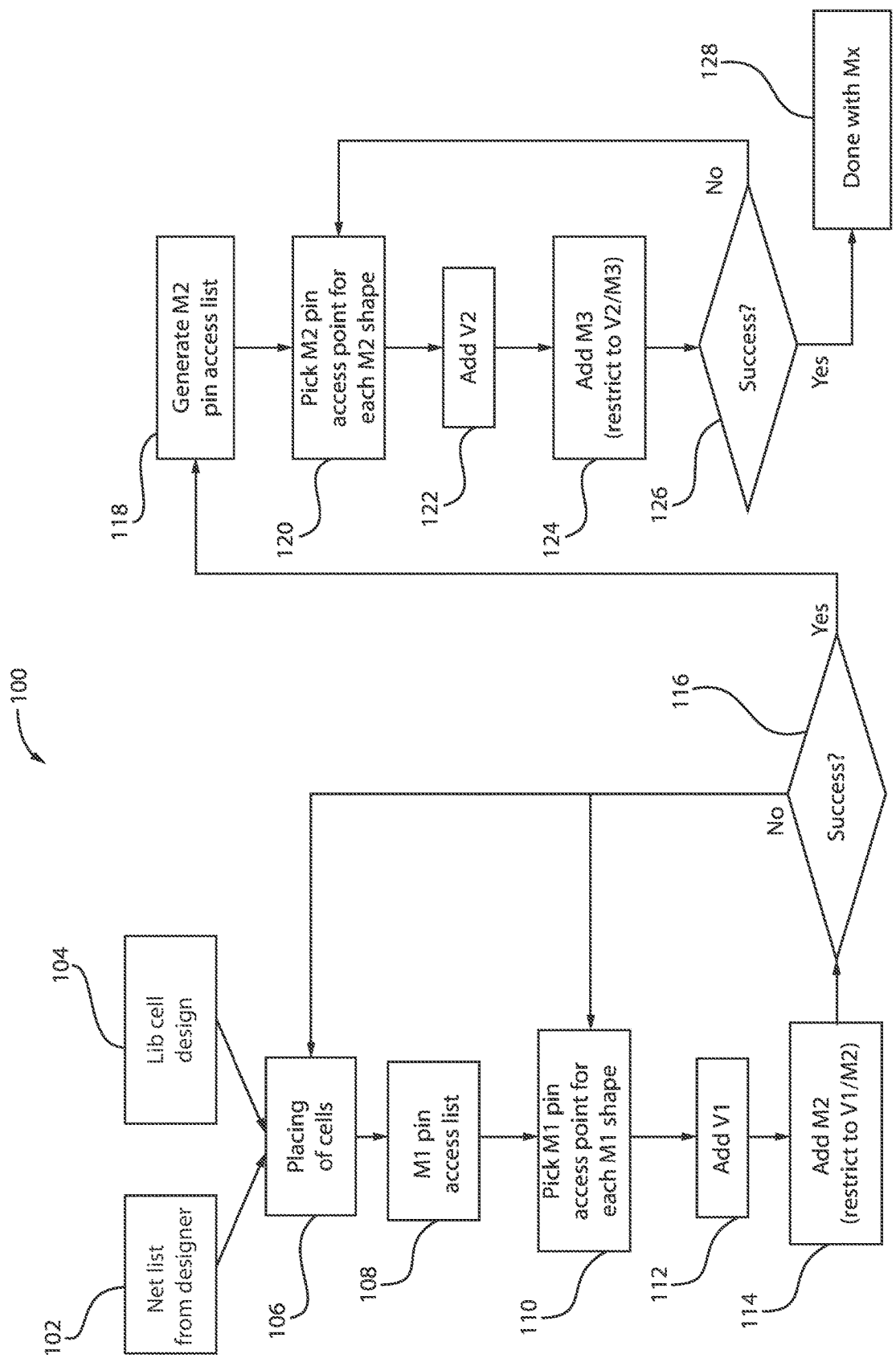
FIG. 4 is a block/flow diagram illustrating a place and route (PnR) flow, in accordance with an embodiment of the present invention.

FIG. 4 is a block/flow diagram illustrating a place and route (PnR) flow 100, in accordance with an embodiment of the present invention.

At block 102, a netlist can be created by a designer. A netlist is a description of the connectivity of an electronic circuit. In its simplest form, a netlist includes a list of the electronic components in a circuit and a list of the nodes they are connected to. Netlists usually provide nothing more than instances, nodes, and perhaps some attributes of the components involved.

At block 104, a library cell design can also be created by a designer. A standard cell library is a collection of low-level electronic logic functions such as AND, OR, INVERT, flip-flops, latches, and buffers. These cells are realized as fixed-height, variable-width full-custom cells. The key aspect with these libraries is that they are of a fixed height, which enables them to be placed in rows, easing the process of automated digital layout. The cells are optimized full-custom layouts, which minimize delays and area. A standard-cell library can include, e.g., two main components: (1) a library database, which includes a number of views often including layout, schematic, symbol, abstract, and other logical or simulation views. From this, various information can be captured in a number of formats, which include reduced information about the cell layouts, sufficient for automated "place and route" tools, and (2) a timing abstract to provide functional definitions, timing, power, and noise information for each cell.

A standard-cell library can also include the following additional components: a full layout of the cells, Spice models of the cells, Verilog models or VHDL-VITAL models, parasitic extraction models, and design rule checking (DRC) rule decks.

At block 106, the netlist design 102 and the library cell design 104 are employed for cell placement 106. The cell is a circuit that has been pre-designed and pre-verified as a building block. In a standard cell design, each distinct cell in a library can have unique geometries of active, gate, and metal levels. With gate arrays, however, each cell shares the same building block, called a core cell that includes fixed active and gate level geometries. Different gate array cells are implemented using only metal interconnections between the active and gate elements of one or more core cells. Examples of a standard cell or gate array cell include an inverter, a NAND gate, a NOR gate, a flip flop, and other similar logic circuits.

During the process of designing an integrated circuit, a designer can select particular cells from a library of cells and use them in a design. The library includes cells that have been designed for a given IC manufacturing process, such as complementary metal oxide semiconductor (CMOS) fabrication. The cells generally have a fixed height but a variable width, which enables the cells to be placed in rows. Cells do not change from one design to the next, but the way in which they are interconnected will, to achieve the desired function in a given design. By being able to select the cells from the library for use in the design, the designer can quickly implement a desired functionality without having to custom design the entire integrated circuit from scratch.

Cells are normally designed so that routing connections between cells can be made efficiently. Routing in an IC design is accomplished through routing elements, such as wires in one or more metal layers. Each metal layer is separated from other metal layers by insulating layers, and vias connect one metal layer to another. These routing elements perform at least two functions: they connect individual transistors that make up a standard cell, and they connect cells to each other globally (e.g., on a chip-level) to implement the desired functionality of the integrated circuit. For example, clock signals, reset signals, test signals, and supply voltages can be carried through these routing elements.

At block 108, a pin access list can be created. The access list can be a first metallization layer (M1) access list. A standard cell includes cell pins that are offset from the edges of the cell based on the locations of the routing tracks relative to the cell boundaries. The cell pins can be wider than minimum metal width wires routed along the routing tracks. By configuring the pins of a standard cell in this manner, the standard cell can be arranged in a layout in its normal orientation, or flipped about its axis. In both orientations, the cell pins still maintain proper alignment with minimum width wires placed along the routing tracks.

A cell described herein refers to a predefined circuit unit or circuit element that is provided, as part of a cell library of many different types of circuit units, to an integrated circuit designer and the cell is re-used in multiple instances as needed to make up the integrated circuit. For example, a cell may be an inverter, a NAND gate, a NOR gate, a flip flop, and other similar logic circuits. Each cell has a boundary, usually including four edges that form a rectangular shape. As used herein, a standard cell refers to a cell with a predefined layout that is used in conjunction with other standard cells to implement a desired functionality of an integrated circuit. Standard cells can have fixed active and gate level geometries. Standard cells can have a fixed height but variable width, which allows the standard cells to be placed side-by-side in rows.

A cell pin described herein refers to metal wires within a cell that serve as connection points for external connections to a cell (e.g., connections between one cell and another cell). Cell pins are sometimes referred to as cell ports, although the term cell pin is meant to include both cell pins and cell ports. Cell pins can be input pins, which are the connection points for the input signals of a standard cell. Cell pins can be output pins, which are connection points for the output signals of a standard cell. The locations of the pins are designated by the designer of the standard cell when creating the cell.

At block 110, an M1 pin access point is selected for each M1 shape. Cell pins are often routed on a lower metal layer, such as a metal one (M1) layer or a metal two (M2) layer. The cell pins are placed in the M1 layer and can be configured to be wider than a minimum metal width specified by design rules.

At block 112, a first via V1 can be added. The via V1 can connect together the metal wires of the different M1 and M2 layers. Routing tracks are reference lines that define the preferred center of chip-level (e.g., cell to cell) routes created by the EDA software 44 during physical implementation 72. The routes can be, for example, wires and vias that connect the cell pins to each other. Routing along tracks allows for faster chip-level routing by the EDA software 44. Although it is possible for EDA software 44 to route off the tracks, this needs more execution time and memory. Thus, routing is more efficient when the cell pins are aligned with the routing tracks to avoid routing off track. Routing along tracks also creates regularity in the wire routing, which decreases routing congestion at the chip-level. Routing tracks can run vertically for vertical wires or horizontally for horizontal wires, resulting in a coarse grid of routing tracks. In one embodiment, routing tracks within a metal layer have a fixed pitch (e.g., distance between routing tracks is fixed).

At block 114, an M2 layer can be added. The via V1 can connect metals layers M1 and M2 at this stage. Integrated circuits layouts have multiple metal layers for routing signals. The layer closest to the substrate is referred to as the metal 1 ("M1") layer. Other metal layers, such as the metal 2 ("M2") and metal 3 ("M3") layers are further from the substrate. In one embodiment, metal layers are routed according to an alternating horizontal-vertical-horizontal (HVH) or vertical-horizontal-vertical (VHV) topology. In other words, all wires (and routing tracks) in a metal layer run predominantly in one direction, and the wires in the adjacent metal layer run predominantly in an orthogonal direction. For example, in the VHV routing topology, the wires in the M1 layer run vertically, the wires in the M2 layer run horizontally, and the wires in the M3 layer run vertically. In another embodiment, metal layers are routed following HHV topology. In this topology, M1 and M2 are predominantly horizontal, M3 is predominantly vertical, and routing directions in subsequent layers alternate with M4 horizontal, M5 vertical, and so on.

An integrated circuit layout must also comply with design rules. Design rules restrict the placement of objects in a layout to account for inevitable variations during the manufacturing process. There are three basic types of objects in any physical design: line objects (e.g., gates, metals), point objects (e.g., contacts, vias) and block objects (e.g., diffusions, implants). Modern layout designs are subject to many design rules that limit both the size of the objects and their proximity to other objects.

At block 116, it is determined whether the via V1 was successfully placed to connect the first metal layer M1 to the second metal layer M2. If NO, the process proceeds back to block 110. If YES, the process proceeds to block 118. In order to ensure a proper via connection to the cell pins, the EDA software 44 must align metal wires with the cell pins.

At block 118, an M2 pin access list is generated.

At block 120, an M2 pin access point is selected for each M2 shape.

At block 122, a second via V2 is added.

At block 124, an M3 layer can be added.

At block 126, it is determined whether the via V2 was successfully placed to connect the second metal layer M2 to the third metal layer M3. If NO, the process proceeds back to block 120. If YES, the process proceeds to block 128. In order to ensure a proper via connection to the cell pins, the EDA software 44 must align metal wires with the cell pins.

At block 128, the metallization process is complete. In other words, all the metallization layers have been connected by one or more vias.

Figure 5:
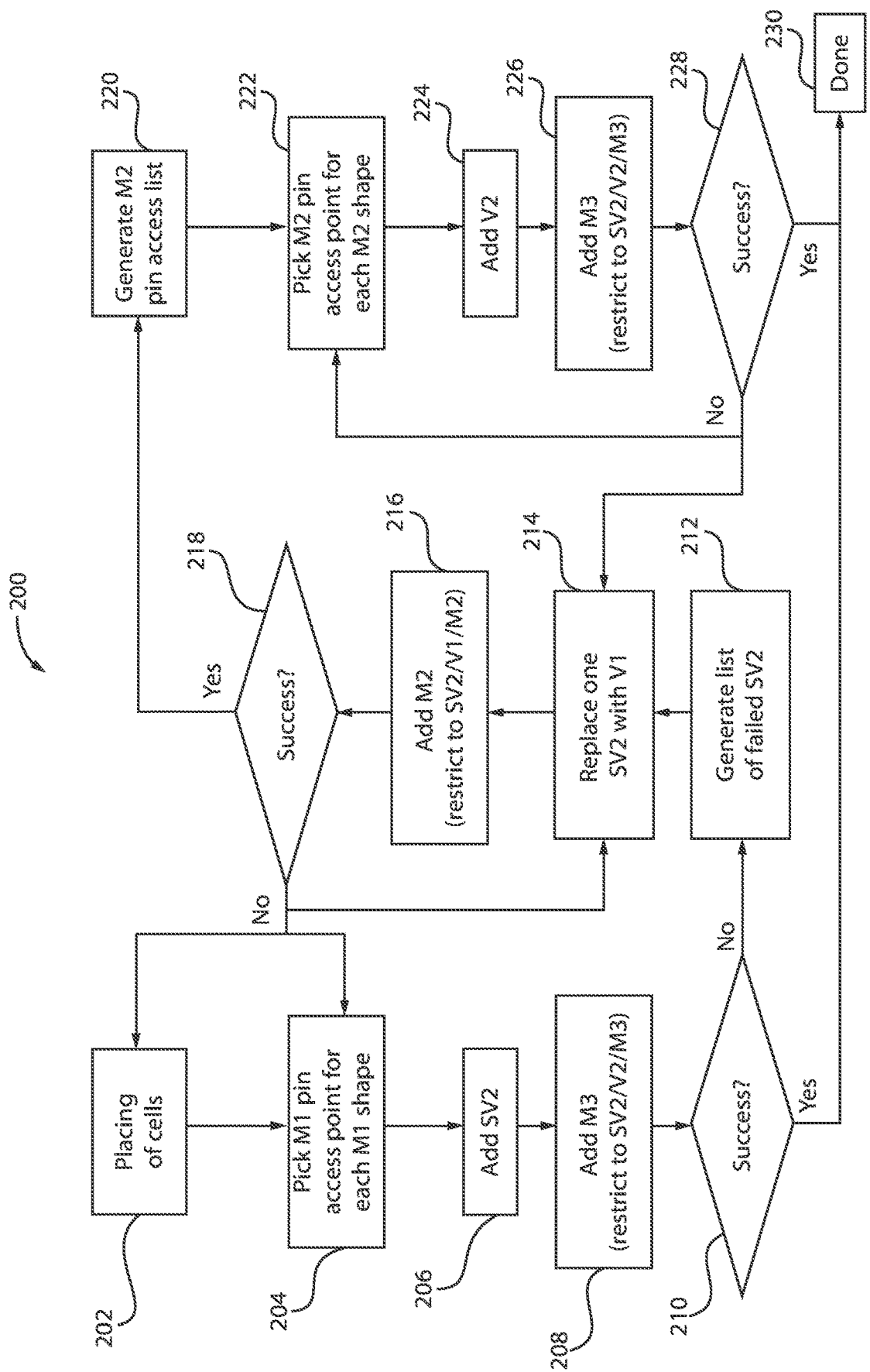
FIG. 5 is a block/flow diagram illustrating a PnR flow enabling one or more skip vias in a first methodology, in accordance with an embodiment of the present invention.

FIG. 5 is a block/flow diagram illustrating a PnR flow 200 enabling one or more skip vias in a first methodology, in accordance with an embodiment of the present invention.

At block 202, a netlist design and/or a library cell design can be employed for cell placement.

At block 204, a pin access list can be created. The access list can be a first metallization layer (M1) access list.

At block 206, a skip via SV2 is added in a layer-by-layer fashion (V1→M2→V2→etc.). A skip via can be formed through many insulator layers, e.g., bypassing one or more wiring structures within the insulator layers, to connect with a lower wiring structure. This provides improved resistance characteristics, minimizes capacitance for a lower wiring structure, e.g., at M0 layer, as well as provides area efficiencies in the chip manufacturing process. In the manufacturing process, the skip via will need to land on a wiring structure in a lower level (e.g., M0 level), while the regular via will need to land on the wiring structure in an upper level (e.g., M1 or above level).

The skip via SV2 is automatically added as a default.

At block 208, a metallization layer M3 is added to connect metal layer M1 to metal layer M3. Therefore, the skip via V2 skips connections to metal layer M2.

At block 210, it is determined whether the skip via V2 was successfully placed to connect the first metal layer M1 to the third metal layer M3. If YES, the process proceeds to block 230 where the skip via addition process is complete. If NO, the process proceeds to block 212. In order to ensure a proper skip via connection to the cell pins, the EDA software 44 must align metal wires with the cell pins.

At block 212, a list is generated of all the failed skip vias.

At block 214, if a failed skip via is detected, it is replaced with a standard via V1.

At block 216, a second metallization layer M2 is added to connect the standard via V1 to the first metallization layer M1. The second metallization layer M2 is only added where a skip via failure occurs. The skip via failure can occur due to, e.g., a design rule violation.

At block 218, is determined whether the standard via V1 was successfully placed to connect the first metal layer M1 to the second metal layer M2. If NO, the process proceeds back to block 204. If YES, the process proceeds to block 220.

At block 220, an M2 pin access list is generated.

At block 222, an M2 pin access point is selected for each M2 shape.

At block 224, a second via V2 is added. V2 is a standard via.

At block 226, an M3 layer can be added.

At block 228, it is determined whether the via V2 was successfully placed to connect the second metal layer M2 to the third metal layer M3. If NO, the process proceeds back to block 222. If YES, the process proceeds to block 230 where the skip via addition process is complete.

Therefore, the PnR flow 200 of FIG. 5 automatically replaces all vias (standard vias) with a skip via. This process ensures that skip vias or super vias are employed as much as possible. If it is determined that the addition of the skip vias creates design rule violations, then a list of all the failed skip vias is created. The failed skip vias are then replaced with standard vias. However, successfully placed skip vias remain intact or in place. The design rule violations can pertain to, e.g., the skip via not landing on minimum Mx−1, the skip via not landing on Mx−1 at minimum space, the skip via not dropping from minimum Mx+1, the skip via not dropping from Mx+1 at minimum space, and minimum distance to existing skip via. Thus, the automatic addition of skip vias must take into consideration design rules pertaining to at least permitted width rules and minimum space rules.

Figure 6:
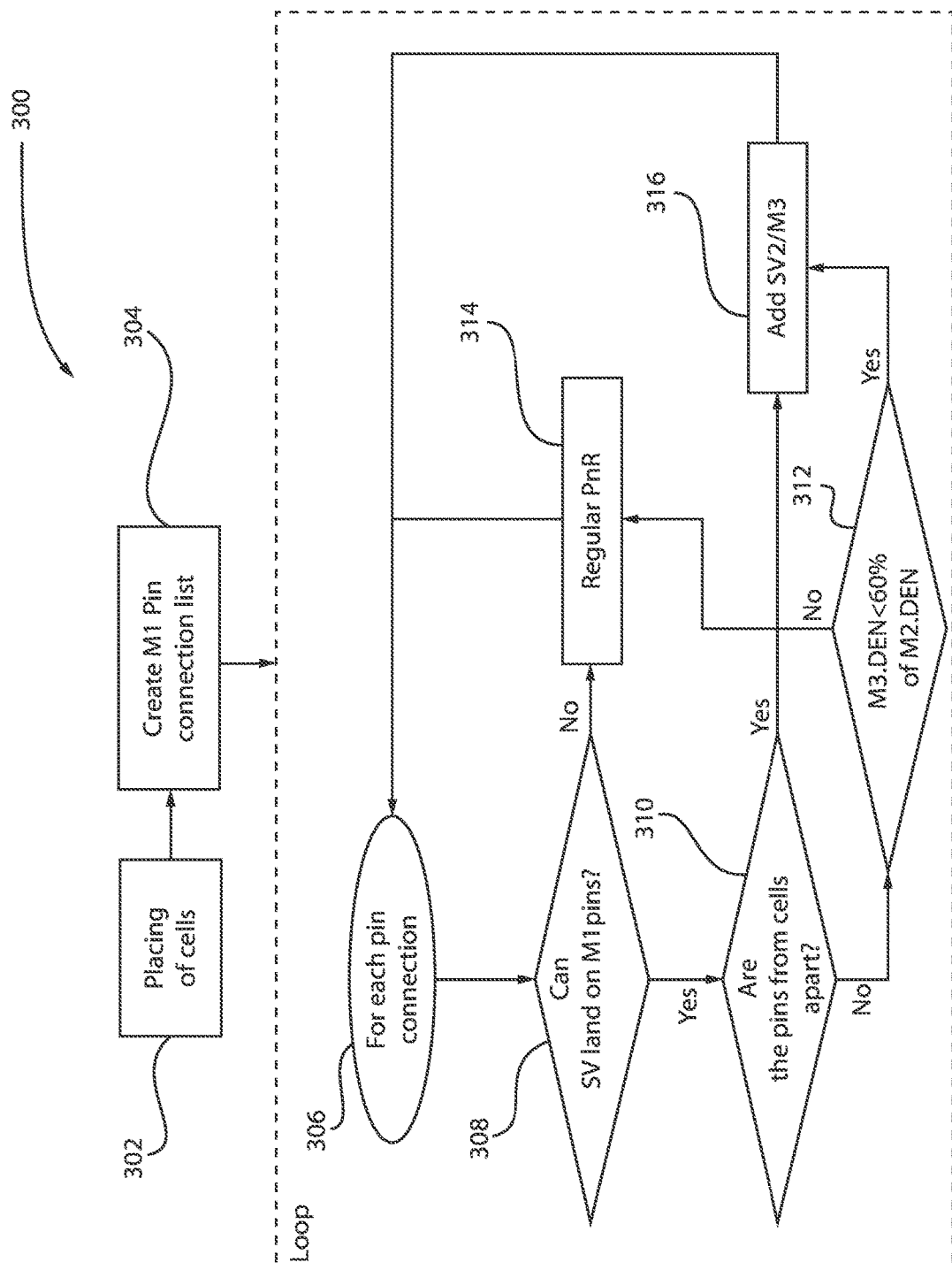
FIG. 6 is a block/flow diagram illustrating a PnR flow enabling one or more skip vias in a second methodology, in accordance with an embodiment of the present invention.

FIG. 6 is a block/flow diagram illustrating a PnR flow 300 enabling one or more skip vias in a second methodology, in accordance with an embodiment of the present invention. In this exemplary embodiment, skip via usage is less aggressive and only used for pins that are far apart. At the same time, this method attempts to maintain similar densities between metal layers.

At block 302, a netlist design and/or a library cell design can be employed for cell placement.

At block 304, an M1 pin connection list is created.

At block 306, each pin connection is detected.

At block 308, it is determined whether a skip via SV can land on M1 pins. It is noted that only SV2-M1 restrictions are considered. If NO, the process proceeds to block 314 where the regular PnR flow 100 is followed. If YES, the process proceeds to block 310.

At block 310, it is determined whether the pins from the cells are apart. In other words, it is determined whether the pins are from different cells. If YES, the process proceeds to block 316 where a skip via V2 is added to connect to metal layer M3. If NO, the process proceeds to block 312.

At block 312, it is determined whether the M3 layer density is less than certain ratio, say 60%, of the M2 layer density. If YES, the process proceeds to block 316 where a skip via V2 is added to connect to metal layer M3. By doing this, M2/M3 density can be balanced. If NO, the process proceeds to block 314 where the regular PnR flow 100 is followed.

Therefore, a method for enabling skip vias in design flow is introduced that maintains or controls process risks while maximizing performance gains. The method enables skip vias in automated place and route design automation, enables automated design flow with controlled process risks, enables automated design flow with maximized RC performance gain, and further enables automated design flow with balanced RC load among two metal layers (e.g., metal layer or level that skip via skips and metal layer or level that skip via connects).

Figure 7:
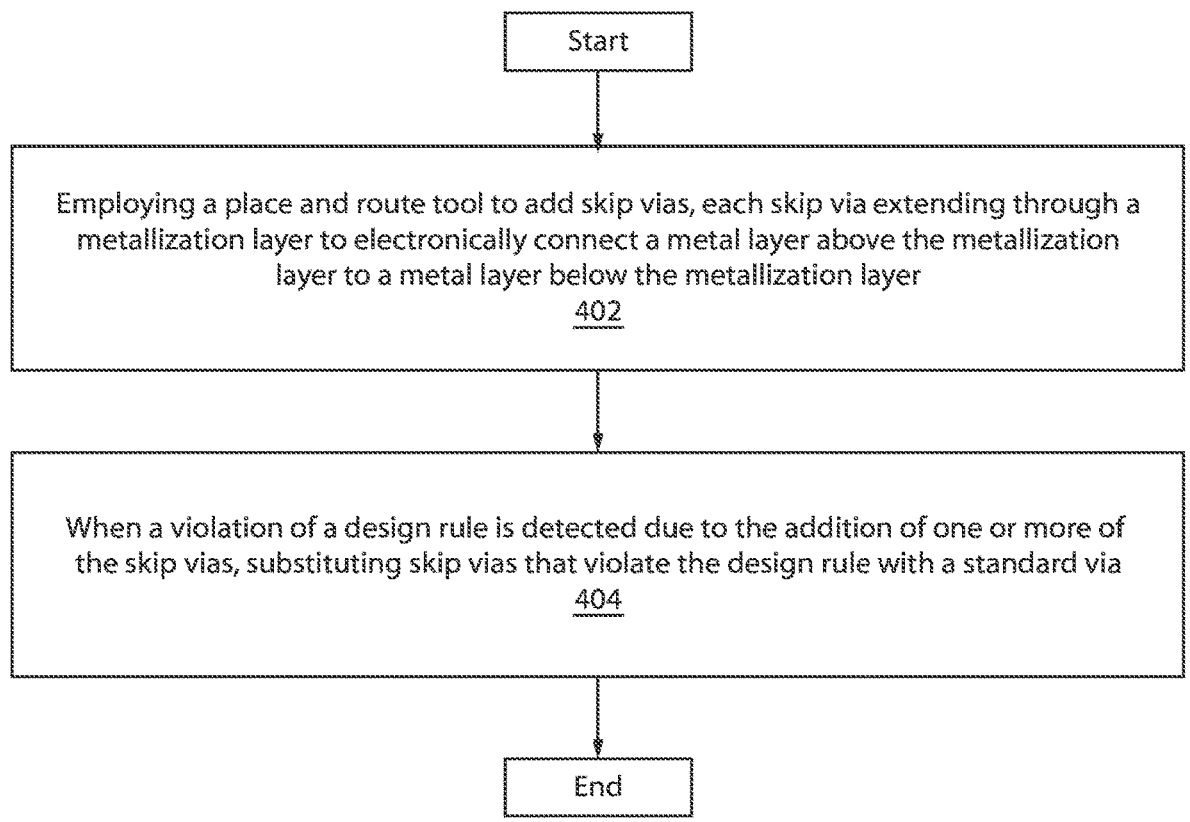
FIG. 7 is a block/flow diagram illustrating a PnR flow when a violation of a design rule is detected, in accordance with an embodiment of the present invention.

FIG. 7 is a block/flow diagram illustrating a PnR flow when a violation of a design rule is detected, in accordance with an embodiment of the present invention.

At block 402, a place and route tool is employed to add the skip vias, each skip via extending through a metallization layer to electrically connect a metal layer above the metallization layer to a metal layer below the metallization layer.

At block 404, when a violation of a design rule is detected due to the addition of one or more of the skip vias, skip vias that violate the design rule are substituted with a standard via.

The design flows of the exemplary embodiments can be a software program that automates back end of the line (BEOL) wiring. Interconnect requirements for the 7 nm technology node and beyond, driven by shrinking front end of the line (FEOL) geometry, push the limits of unit process tools for BEOL as well as FEOL. Lengthy and costly in-fab experiments are needed to ensure that the integrated BEOL process meets local performance and cross-wafer uniformity requirements. A module-level approach can be employed to compensate for local and cross-wafer process variations of each unit process by making adjustments elsewhere in the process flow, but such a strategy needs an excessive amount of test wafer analysis to characterize the process interactions. Virtual fabrication design flows conducted by the exemplary embodiments of the present invention allow for incorporation of skip vias into the virtual fabrication to reduce RC and to reduce the need for minimum area wires.

Therefore, leading-edge semiconductor manufacturing requires the integration of hundreds of process steps to fabricate transistors with increasingly sophisticated 3D geometry. Greater process complexity has, in turn, dramatically increased the number of costly, time-consuming silicon build-and-test learning cycles needed to bring new technology nodes to production. However, virtual fabrication can be employed to reduce or replace these learning cycles with predictive integrated process modeling advanced herein incorporating skip vias (or super vias) in the PnR flow designs.

Figure 8:
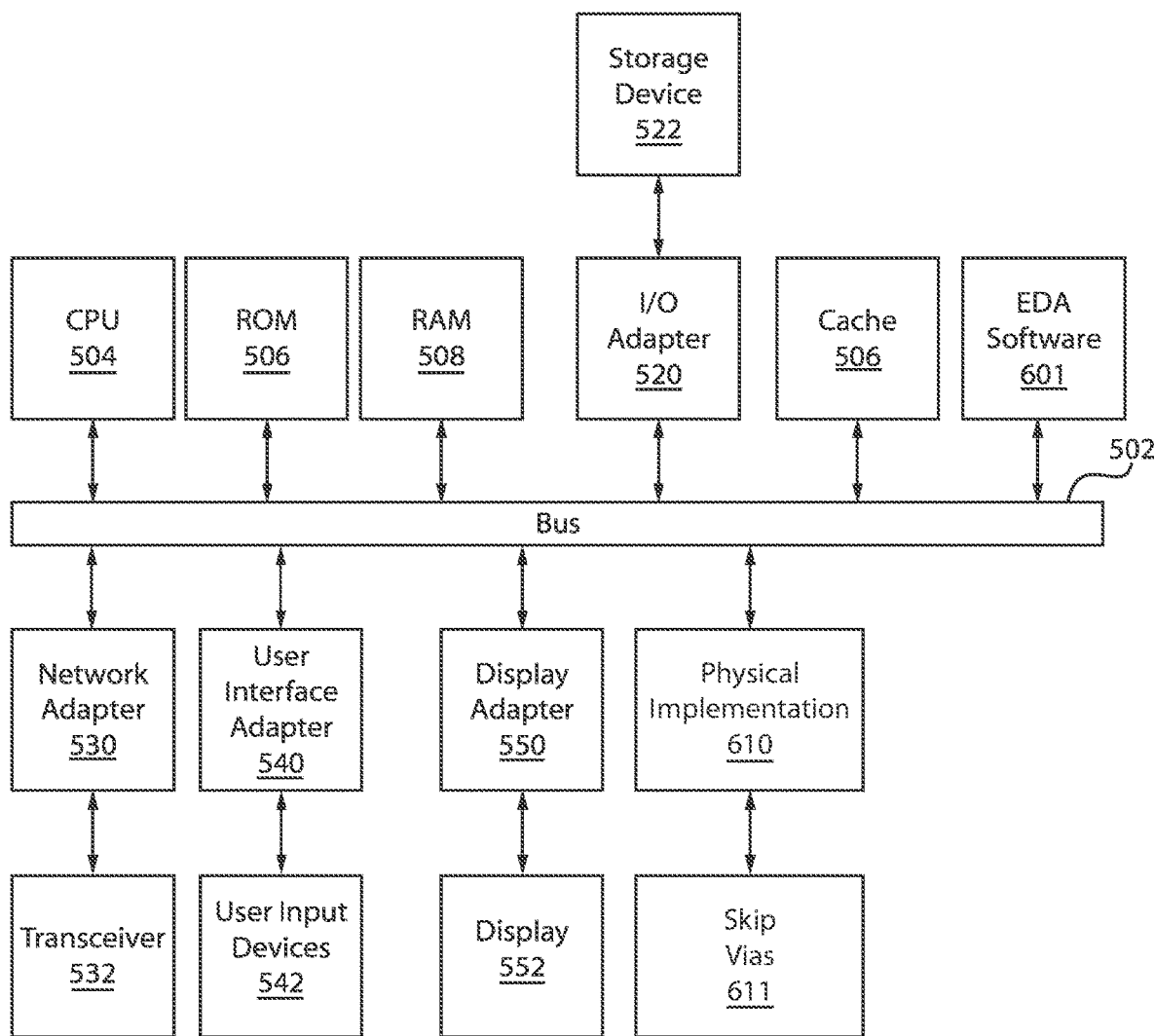
FIG. 8 is an exemplary processing system for enabling the insertion of one or more skip vias, in accordance with embodiments of the present invention.

FIG. 8 is an exemplary processing system for enabling the insertion of one or more skip vias, in accordance with embodiments of the present invention.

The processing system includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 530, a user interface adapter 540, and a display adapter 550, are operatively coupled to the system bus 502. Additionally, EDA software 601 is operatively coupled to the system bus 502. The EDA software 601 adds the skips vias 611 in, e.g., the physical implementation phase 610.

A storage device 522 is operatively coupled to system bus 502 by the I/O adapter 520. The storage device 522 can be any of a disk storage device (e.g., a magnetic or optical disk storage device), a solid state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the skip via processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the skip via processing system are readily contemplated by one of ordinary skill in the art given the teachings of the present invention provided herein.

Figure 9:
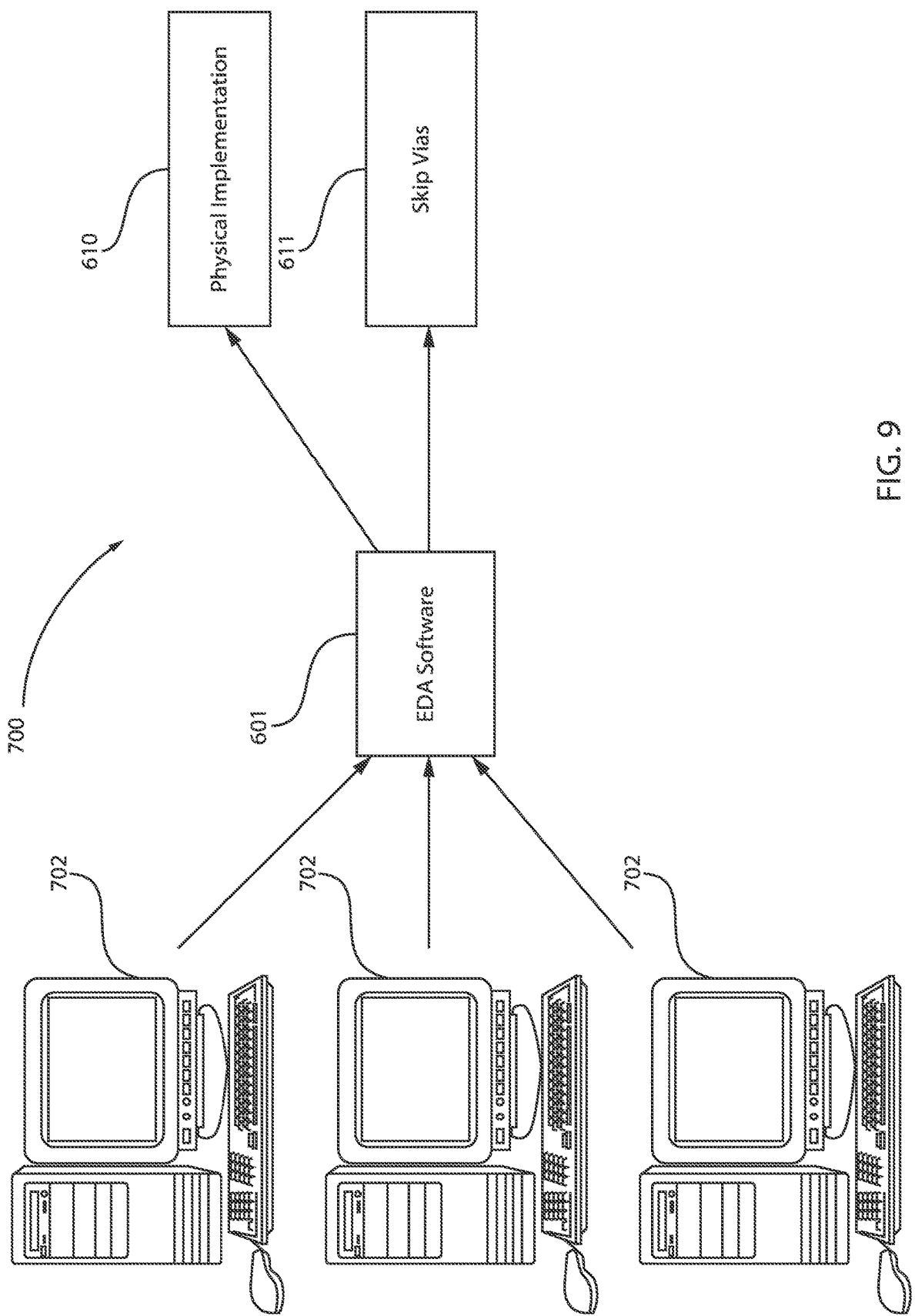
FIG. 9 is a block/flow diagram of an exemplary system network where users access electronic design automation (EDA) tools to place one or more skip vias, in accordance with embodiments of the present invention.

FIG. 9 is a block/flow diagram of an exemplary system network where users access electronic design automation (EDA) tools to place one or more skip vias, in accordance with embodiments of the present invention.

In system 700, a plurality of users 702 can access the EDA software 601 to access a physical implementation tool 610 to place skip vias 611.

Throughout this specification, plural instances may implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

The various operations of example methods described herein, such as those performed by the compiler, can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors or processor-implemented hardware modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for incorporating skip vias in a place and route flow of an integrated circuit design (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for incorporating skip vias in a place and route flow of an integrated circuit design, the method comprising:
   placing cells by employing a place and route tool;
   selecting first metal layer pin access points for each first metal layer shape;
   adding a skip via over the first metal layer;
   adding a third metal layer over the skip via, the third metal layer connected to the first metal layer;
   determining whether a violation of a design rule is triggered due to the addition of the skip via; and if the violation of the design rule is confirmed, substituting the skip via with a standard via.

2. The method of claim 1, further comprising, if the violation of the design rule is confirmed, adding a second metal layer to connect the standard via between the first and second metals layers.

3. The method of claim 2, further comprising, determining whether the adding of the second metal layer triggers the violation of the design rule.

4. The method of claim 1, further comprising automatically adding the skip vias during the place and route flow.

5. The method of claim 1, further comprising adding the skip vias in a layer-by-layer fashion.

6. The method of claim 1, further comprising generating a list of failed skip vias.

7. The method of claim 1, wherein the place and route tool is a program that automates back end of the line (BEOL) wiring.

8. The method of claim 1, wherein the design rule includes width rules and minimum space rules.

9. The method of claim 1, wherein the skip vias enable reduction of resistance-capacitance (RC) and eliminate metallization layer minimum area.

10. The method of claim 1, wherein the skip vias enable automated design flow with balanced resistance-capacitance (RC) load among two metallization layers.

11. A method for incorporating skip vias in a place and route flow of an integrated circuit design, the method comprising:
    placing cells by employing a place and route tool;
    selecting first metal layer pin access points for each first metal layer shape;
    adding a skip via over the first metal layer;
    determining whether a violation of a design rule is triggered due to the addition of the skip via; and
    if the violation of the design rule is confirmed, substituting the skip via with a standard via.

12. The method of claim 11, further comprising adding a third metal layer over the skip via, the third metal layer connected to the first metal layer.

13. The method of claim 12, further comprising, if the violation of the design rule is confirmed, adding a second metal layer to connect the standard via between the first and second metals layers.

14. The method of claim 13, further comprising, determining whether the adding of the second metal layer triggers the violation of the design rule.

15. The method of claim 11, further comprising automatically adding the skip vias during the place and route flow.

16. The method of claim 11, further comprising adding the skip vias in a layer-by-layer fashion.

17. The method of claim 11, further comprising generating a list of failed skip vias.

18. The method of claim 11, wherein the place and route tool is a program that automates back end of the line (BEOL) wiring.

19. The method of claim 11, wherein the design rule includes width rules and minimum space rules.

20. The method of claim 11, wherein the skip vias enable reduction of resistance-capacitance (RC) and eliminate metallization layer minimum area.

* * * * *